United States Patent
Morris et al.

(10) Patent No.: US 9,511,802 B2
(45) Date of Patent: Dec. 6, 2016

(54) ELASTICALLY AVERAGED ALIGNMENT SYSTEMS AND METHODS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 488 days.

(21) Appl. No.: 14/045,463

(22) Filed: Oct. 3, 2013

(65) Prior Publication Data

US 2015/0098748 A1    Apr. 9, 2015

(51) Int. Cl.
| | |
|---|---|
| B62D 27/06 | (2006.01) |
| B62D 27/02 | (2006.01) |
| B60R 13/00 | (2006.01) |
| F16B 19/00 | (2006.01) |

(52) U.S. Cl.
CPC ............. *B62D 27/02* (2013.01); *B60R 13/00* (2013.01); *B62D 27/06* (2013.01); *F16B 19/004* (2013.01); *Y10T 29/49945* (2015.01); *Y10T 403/1616* (2015.01)

(58) Field of Classification Search
CPC ............. B60R 13/04; B60R 13/0262; B60R 13/0206; B60R 19/44; B60R 19/445; B62D 27/04; B62D 27/023; F16B 21/08; F16B 21/086; F16B 21/088; F16B 21/06; F16B 5/0032; F16B 5/0056; F16B 5/0657
See application file for complete search history.

(56) References Cited

U.S. PATENT DOCUMENTS

| | | |
|---|---|---|
| 419,358 A | 1/1890 | Raymond et al. |
| 1,219,398 A | 3/1917 | Huntsman |
| 1,261,036 A | 4/1918 | Kerns |
| 1,301,302 A | 4/1919 | Nolan |
| 1,556,233 A | 10/1925 | Maise |

(Continued)

FOREIGN PATENT DOCUMENTS

| | | |
|---|---|---|
| BE | 842302 A | 9/1976 |
| CN | 1032581 A | 4/1989 |

(Continued)

OTHER PUBLICATIONS

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.

(Continued)

*Primary Examiner* — Daniel Wiley
(74) *Attorney, Agent, or Firm* — Cantor Colburn LLP

(57) ABSTRACT

In one aspect, an elastically averaged alignment system is provided. The alignment system includes a first component including at least one corner region having an alignment member, and a second component including at least one corner region having an inner wall defining an alignment aperture. The alignment aperture is configured to receive at least a portion of the alignment member to couple the first component and the second component. The alignment member is an elastically deformable material such that when the alignment member is inserted into the alignment aperture, the alignment member elastically deforms to an elastically averaged final configuration to facilitate aligning the corner regions of the first and second components in a desired orientation.

19 Claims, 2 Drawing Sheets

(56) References Cited

U.S. PATENT DOCUMENTS

| | | |
|---|---|---|
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,058,319 A | 10/1936 | Jones |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,580,628 A | 5/1971 | Rantala |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,715,095 A | 12/1987 | Takahashi |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,309 A | 4/1989 | Behymer |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,907,582 A | 3/1990 | Meyerrose |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth |
| 5,178,433 A | 1/1993 | Wagner |
| 5,180,219 A | 1/1993 | Geddie |
| 5,186,517 A | 2/1993 | Gilmore et al. |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |

(56) References Cited

U.S. PATENT DOCUMENTS

| | | |
|---|---|---|
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A | 8/1997 | Berg et al. |
| 5,666,749 A | 9/1997 | Waters |
| 5,667,271 A | 9/1997 | Booth |
| 5,670,013 A | 9/1997 | Huang et al. |
| 5,698,276 A | 12/1997 | Mirabitur |
| 5,702,779 A | 12/1997 | Siebelink, Jr. et al. |
| 5,704,753 A | 1/1998 | Ueno |
| 5,706,559 A | 1/1998 | Oliver |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,799,930 A | 9/1998 | Willett |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,865,500 A | 2/1999 | Sanada et al. |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,036,198 A | 3/2000 | Kramer |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,594,861 B2 | 7/2003 | Dimig et al. |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,846,125 B2 | 1/2005 | Smith et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,165,310 B2 | 1/2007 | Murakami et al. |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,275,772 B2 | 10/2007 | Lee |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |

(56) References Cited

U.S. PATENT DOCUMENTS

| | | |
|---|---|---|
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 7,971,913 B2 | 7/2011 | Sunahara et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,328,250 B2 | 12/2012 | Botten et al. |
| 8,371,788 B2 | 2/2013 | Lange |
| 8,371,789 B2 | 2/2013 | Takita |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,520,404 B2 | 8/2013 | Hamaguchi |
| 8,572,818 B2 | 11/2013 | Hofmann |
| 8,579,141 B2 | 11/2013 | Tejima |
| 8,619,504 B2 | 12/2013 | Wyssbrod |
| 8,656,563 B2 | 2/2014 | Hiramatsu et al. |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,038,335 B1 | 5/2015 | Eck |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 9,302,569 B2 | 4/2016 | Ogino et al. |
| 9,303,667 B2 | 4/2016 | Morris et al. |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0107202 A1 | 6/2003 | Tajima et al. |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0083583 A1 | 5/2004 | Bradley |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0191123 A1 | 9/2005 | Wertz |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yi |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260454 A1 | 10/2008 | Girodo et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2009/0318069 A1 | 12/2009 | Konet |
| 2010/0000156 A1 | 1/2010 | Salhoff |
| 2010/0001539 A1 | 1/2010 | Kikuchi et al. |
| 2010/0021267 A1 | 1/2010 | Nitsche |

(56) References Cited

U.S. PATENT DOCUMENTS

| | | |
|---|---|---|
| 2010/0061045 A1 | 3/2010 | Chen |
| 2010/0102538 A1 | 4/2010 | Paxton |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan et al. |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0115656 A1 | 4/2015 | Lungershausen |
| 2015/0135509 A1 | 5/2015 | Morris et al. |
| 2015/0164184 A1 | 6/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0192160 A1 | 7/2015 | Gong |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0308534 A1 | 10/2015 | Smith et al. |
| 2015/0308538 A1 | 10/2015 | Morris et al. |
| 2015/0353028 A1 | 12/2015 | Courtin et al. |
| 2015/0375798 A1 | 12/2015 | Morris et al. |

FOREIGN PATENT DOCUMENTS

| | | |
|---|---|---|
| CN | 1036250 A | 10/1989 |
| CN | 1062629 A | 7/1992 |
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 2874103 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101002030 A | 7/2007 |
| CN | 101005741 A | 7/2007 |
| CN | 200941716 Y | 8/2007 |
| CN | 200957794 Y | 10/2007 |
| CN | 101250964 A | 4/2008 |
| CN | 101390022 A | 3/2009 |
| CN | 201259846 Y | 6/2009 |

(56) References Cited

FOREIGN PATENT DOCUMENTS

| | | |
|---|---|---|
| CN | 201268336 Y | 7/2009 |
| CN | 201310827 Y | 9/2009 |
| CN | 101701595 A | 5/2010 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102463882 A | 5/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102886753 A | 1/2013 |
| CN | 102904128 A | 1/2013 |
| CN | 202686206 U | 1/2013 |
| CN | 102918315 A | 2/2013 |
| CN | 102939022 A | 2/2013 |
| CN | 202764872 U | 3/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 103567916 A | 2/2014 |
| CN | 103586684 A | 2/2014 |
| CN | 103586685 A | 2/2014 |
| CN | 103591102 A | 2/2014 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3008990 A1 | 9/1980 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10003852 A1 | 8/2001 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102010026218 A1 | 1/2012 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| GB | 2496613 A | 6/2013 |
| JP | S6054264 A | 3/1985 |
| JP | H10861318 A | 3/1996 |
| JP | H08200420 A | 8/1996 |
| JP | H0942233 A | 2/1997 |
| JP | 2000010514 A | 1/2000 |
| JP | 2000192924 A | 7/2000 |
| JP | 2000287717 A | 10/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2010266519 A | 11/2010 |
| JP | 2011085174 A | 4/2011 |
| JP | 2012060791 A | 3/2012 |
| JP | 2012112533 A | 6/2012 |
| JP | 2012126421 A | 7/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2011089650 A1 | 7/2011 |
| WO | 2013088447 A1 | 6/2013 |
| WO | 2013191622 A1 | 12/2013 |
| WO | 2014119366 A1 | 8/2014 |

OTHER PUBLICATIONS

U.S. Appl. No. 13/752,499, filed Jan. 29, 2013, entitled "Elastic Insert Alignment Assembly and Method of Reducing Positional Variation", inventors: Steven E. Morris, and Michael D. Richardson.

U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.

U.S. Appl. No. 13/851,222, filed Mar. 27, 2013, entitled "Elastic Averaged Alignment System", inventors: Joel Colombo and Steven E. Morris.

U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.

(56) References Cited

OTHER PUBLICATIONS

U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.

U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.

U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.

U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.

U.S. Appl. No. 13/858,478, filed Apr. 8, 2013, entitled "Elastic Mating Assembly and Method of Elastically Assembling Matable Components", inventors: Steven E. Morris and Jennifer P. Lawall.

U.S. Appl. No. 13/859,109, filed Apr. 9, 2013, entitled "Elastic Retaining Arrangement for Joint Components and Method of Reducing a Gap Between Jointed Components," inventors: Steven E. Morris, James M. Kushner, Victoria L. Enyedy, Jennifer P. Lawall, and Piotr J. Ogonek.

Chinese Office Action for CN201410516491.5 dated Feb. 1, 2016.

"Elastic Averaging in Flexure Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Precisely Locating Components in an Infrared Welded Assembly", inventor: Steven E. Morris.

U.S. Appl. No. 13/459,118, filed Apr. 28, 2012, entitled "Stiffened Multi-Layer Compartment Door Assembly Utilizing Elastic Averaging," inventor: Steven E. Morris.

U.S. Appl. No. 13/567,580, filed Aug. 6, 2012, entitled "Semi-Circular Alignment Features of an Elastic Averaging Alignment System", inventors: Steven E. Morris and Thomas F. Bowles.

U.S. Appl. No. 13/570,959, filed Aug. 9, 2012, entitled "Elastic Cantilever Beam Alignment System for Precisely Aligning Components", inventor: Steven E. Morris.

U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.

U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.

U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.

U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.

U.S. Appl. No. 13/918,183, filed Jun. 14, 2013, entitled "Elastic Retaining Assembly for Matable Components and Method of Assembling," inventors: Steven E. Morris and Jennifer P. Lawall.

U.S. Appl. No. 13/939,503, filed Jul. 11, 2013, entitled "Elastically Averaged Alignment Systems and Methods," inventor: Joel Colombo.

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E. Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E. Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed Sep. 27, 2013, entitled "Elastically Averaged Alignment Systems and Methods," inventor: Steven E. Morris.

U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed Oct. 3, 2013, entitled "Elastically Averaged Alignment Systems and Methods," inventors: Steven E. Morris and Jennifer P. Lawall.

U.S. Appl. No. 14/081,361, filed Nov. 15, 2013, entitled "Elastically Deformable Clip and Method," inventors: Steven E. Morris, Jennifer P. Lawall and Jeffrey M. Gace.

U.S. Appl. No. 14/104,321, filed Dec. 12, 2013, entitled "Alignment and Retention System for a Flexible Assembly," inventors: Steven E. Morris and Jennifer P. Lawall.

(56) References Cited

OTHER PUBLICATIONS

U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.
U.S. Appl. No. 14/109,296, filed Dec. 17, 2013, entitled "Fastener for Operatively Coupling Matable Components," inventors: Steven E. Morris and Jennifer P. Lawall.
U.S. Appl. No. 14/134,622, filed Dec. 19, 2013, entitled "Elastic Averaging Alignment Member," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris and Jennifer P. Lawall.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
Rojas, F.E., et al., "Kinematic Coupling for Precision Fixturing & Assembly" MIT Precision Engineering Research Group, Apr. 2013; 24 pgs.
Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.
Willoughby, P., "Elastically Averaged Precision Alignment", Degree of Doctor of Philosophy in Mechanical Engineering Dissertation, Massachusetts Institute of Technology, 2005; 158 pgs.
"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

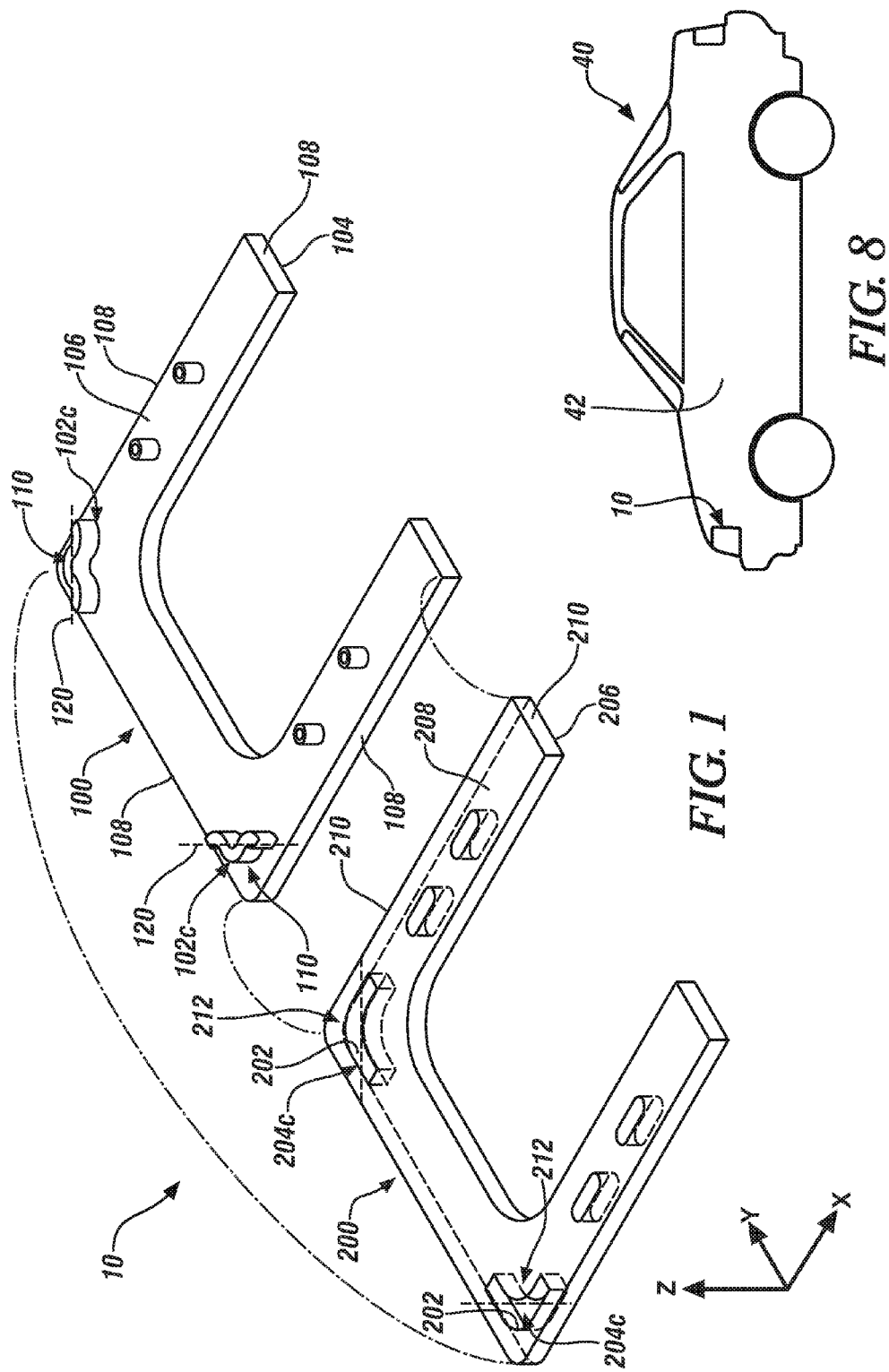

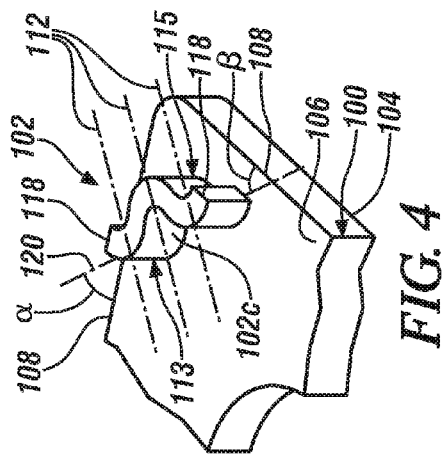
FIG. 3
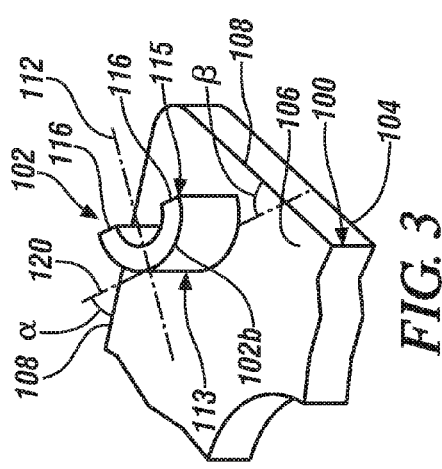
FIG. 4
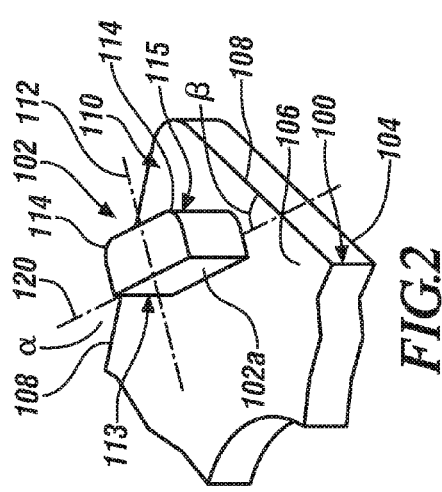
FIG. 2
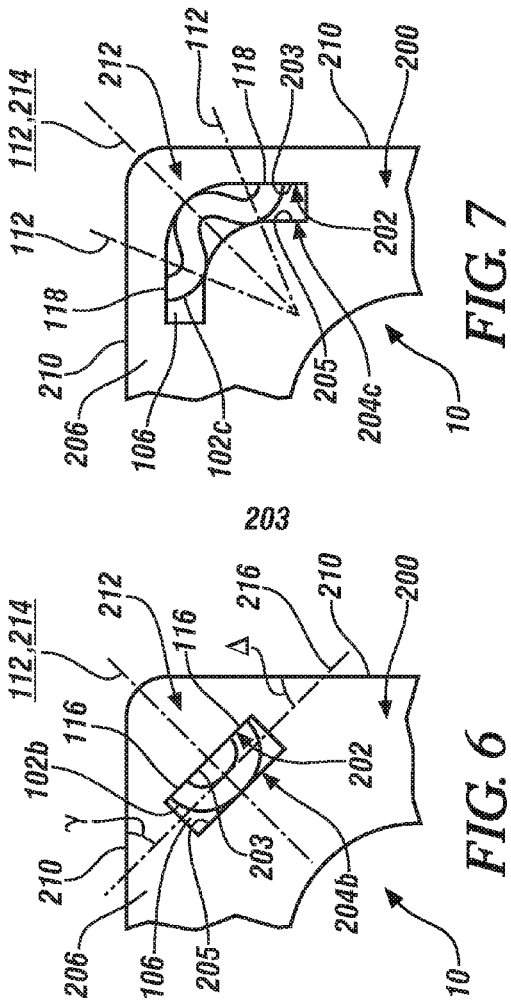
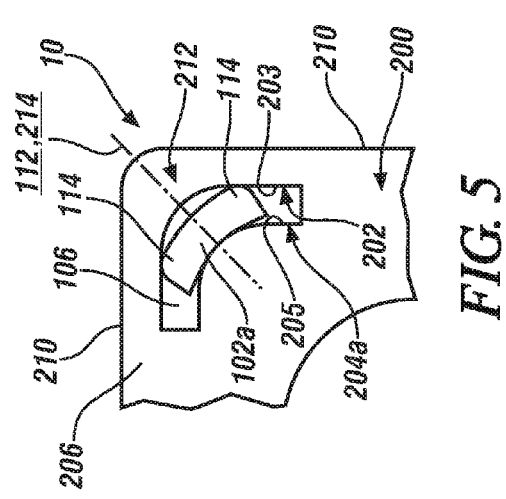

ELASTICALLY AVERAGED ALIGNMENT SYSTEMS AND METHODS

FIELD OF THE INVENTION

The subject invention relates to matable components, and more specifically, to elastically averaged matable components.

BACKGROUND

Components, in particular vehicular components, which are to be mated together in a manufacturing process, are mutually located with respect to each other by alignment features that are oversized holes and/or undersized upstanding bosses. Such alignment features are sized to provide spacing to freely move the components relative to one another to align them without creating an interference therebetween that would hinder the manufacturing process. One such example includes two-way and/or four-way male alignment features, typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, particularly at corner regions of the mated components, which may contribute to the presence of undesirably large variation in their alignment, particularly with regard to gaps and/or spacing therebetween. In the case where misaligned components are also part of another assembly, such misalignments may also affect the function and/or aesthetic appearance of the entire assembly. Regardless of whether such misalignment is limited to two components or an entire assembly, it can negatively affect function and result in a perception of poor quality. Moreover, clearance between misaligned components may lead to relative motion therebetween, which may cause undesirable noise such as squeaking and rattling, and further result in the perception of poor quality.

SUMMARY OF THE INVENTION

In one aspect, an elastically averaged alignment system is provided. The alignment system includes a first component including at least one corner region having an alignment member, and a second component including at least one corner region having an inner wall defining an alignment aperture. The alignment aperture is configured to receive at least a portion of the alignment member to couple the first component and the second component. The alignment member is an elastically deformable material such that when the alignment member is inserted into the alignment aperture, the alignment member elastically deforms to an elastically averaged final configuration to facilitate aligning the corner regions of the first and second components in a desired orientation.

In another aspect, a vehicle is provided. The vehicle includes a body and an elastically averaged alignment system integrally arranged with the body. The elastically averaged alignment system includes a first component including at least one corner region having an alignment member, and a second component including at least one corner region having an inner wall defining an alignment aperture. The alignment aperture is configured to receive at least a portion of the alignment member to couple the first component and the second component. The alignment member is an elastically deformable material such that when the alignment member is inserted into the alignment aperture, the alignment member elastically deforms to an elastically averaged final configuration to facilitate aligning the corner regions of the first and second components in a desired orientation.

In yet another aspect, a method of coupling a first component and a second component is provided. The method includes providing a first component that includes at least one corner region having an alignment member, and providing a second component that includes at least one corner region having an inner wall defining an alignment aperture. The method further includes forming the alignment member from an elastically deformable material, and inserting the alignment member into the alignment aperture such that the alignment member elastically deforms to an elastically averaged final configuration to facilitate coupling the first and second components and aligning the corner regions in a desired orientation The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a perspective view of an exemplary, unassembled elastically averaged alignment system;

FIG. 2 is a perspective view of an exemplary alignment member shown in FIG. 1;

FIG. 3 is a perspective view of another exemplary alignment member shown in FIG. 1;

FIG. 4 is a perspective view of another exemplary alignment member shown in FIG. 1;

FIG. 5 is a plan view of a portion of the elastically averaged alignment system shown in FIG. 1 and after assembly;

FIG. 6 is a plan view of another portion of the elastically averaged alignment system shown in FIG. 1 and after assembly;

FIG. 7 is a plan view of another portion of the elastically averaged alignment system shown in FIG. 1 and after assembly; and FIG. 8 is a side view of a vehicle employing the elastically averaged alignment system shown in FIGS. 1-7.

DETAILED DESCRIPTION

The following description is merely exemplary in nature and is not intended to limit the present disclosure, its application or uses. For example, the embodiments shown are applicable to vehicle body panels, but the alignment system disclosed herein may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Described herein are alignment systems and methods for elastically averaged mating assemblies. The alignment systems and methods include matable components with elastically deformable corner region features to facilitate a desired orientation between the components, particularly at the aforementioned corner regions.

FIG. 1 illustrates an exemplary elastically averaged alignment system 10 that generally includes a first component 100 to be mated to a second component 200. First component 100 includes elastically deformable alignment members 102, and second component 200 includes inner walls 202 defining alignment apertures 204. Alignment members 102 and alignment apertures 204 are fixedly disposed on or formed integrally with their respective component 100, 200 for proper alignment and orientation when components 100 and 200 are mated. Although two alignment members 102 and two corresponding alignment apertures 204 are illustrated, components 100 and 200 may have any number and combination of corresponding alignment members 102 and alignment apertures 204. Elastically deformable alignment members 102 are configured and disposed to interferingly, deformably, and matingly engage alignment apertures 204, as discussed herein in more detail, to precisely align first component 100 with second component 200 in four directions, such as the +/−x-direction and the +/−y-direction of an orthogonal coordinate system, for example, which is herein referred to as four-way alignment.

In the exemplary embodiment, first component 100 generally includes an outer face 104, an inner face 106, and edges 108. Two intersecting edges 108 define corner regions 110 from which alignment members 102 extend. Although illustrated as having two corner regions 110, first component 100 may have any number of intersecting edges 108 that define a corresponding corner region 110. Further, corner region 110 may be defined by any angular intersection of two edges 108; for example, two intersecting edges 108 may form an angle of 60°, 90°, or 120° therebetween, for example. In the exemplary embodiment, first component 100 is fabricated from an elastically deformable material such as plastic. However, first component 100 may be fabricated from any suitable material that enables system 10 to function as described herein.

As further illustrated in FIGS. 2-4, alignment members 102 may have various shapes. For example, alignment members 102a are each a generally rectangular and substantially linear tab having a center line 112 and corner portions 114 (FIG. 2); an alignment member 102b is a curved tab (e.g., semi-circular) having a curve center line 112 and end portions 116 (FIG. 3); and an alignment member 102c is a wave-shaped tab having curve center lines 112 (e.g., located substantially through each crest of each wave-shape) and end portions 118 (FIG. 4). Each of alignment members 102a, 102b, 102c includes a proximal end 113 coupled to inner face 106, and a distal end 115. Alternatively, alignment members 102 may have any shape that enables system 10 to function as described herein. Alignment members 102 may also have various orientations at each corner region 110. For example, as shown in FIGS. 2-4, alignment members 102 are generally oriented along a line 120 to define an angle "α" with respect to one edge 108 and to define an angle "β" with respect to another edge 108. In the exemplary embodiment, angles "α" and "β" are each approximately 45°, However, alignment members 102 may be oriented at any angle "α" and "β" that enables system 10 to function as described herein. For example, angle "α" may be approximately 60° and angle "β" may be approximately 30°, or angles "α" and "β" may vary in embodiments having more than four edges 108.

Second component 200 generally includes an outer face 206, an inner face 208, and edges 210. Two intersecting edges 210 define corner regions 212 that include at least one alignment aperture 204. Although illustrated in FIG. 1 as having two corner regions 212, second component 200 may have any number of intersecting edges 210 that define a corresponding corner region 212. Further, corner region 212 may be defined by any angular intersection of two edges 210 similar to corner regions 110. In the exemplary embodiment, alignment apertures 204 have various shapes corresponding with each shape of associated alignment member 102. For example, as shown in FIGS. 5-7, alignment apertures 204a are curved slots having a curve center line 214; an alignment aperture 204b is a generally rectangular and substantially linear slot having center line 214; and an alignment aperture 204c is a curved slot having curve center line 214. Alternatively, alignment aperture 204 may have any shape that enables system 10 to function as described herein. Further, alignment apertures 204 may have various orientations on each corner region 212 corresponding to the orientation of associated alignment members 102. For example, as shown in FIGS. 6, alignment aperture 204b is oriented along a line 216 to define an angle "γ" and "Δ" with respect to intersecting edges 210. In the exemplary embodiment, angles "γ" and "Δ" are each approximately 45°. However, alignment apertures 204 may be oriented at any angle "γ" and "Δ" that enables system 10 to function as described herein.

In an exemplary embodiment, at least a portion of inner wall 202 and/or outer wall 210 may be elastically deformable to facilitate added elastic average tuning of system 10. For example, inner wall 202 and/or a surrounding portion of second component 200 may be made from an elastically deformable material and/or have a smaller thickness or sheet metal gauge than the rest of component 200. As such, during insertion of alignment member 102 into alignment aperture 204, inner wall 202 and/or a surrounding portion of component 200 elastically deforms to an elastically averaged final configuration to facilitate aligning first component 100 and second component 200 in a desired orientation. Accordingly, alignment member 102 thicknesses and second component 200 material and/or gauge may be adjusted to tune the elastic average mating between first component 100 and second component 200.

While not being limited to any particular structure, first component 100 may be a decorative trim component of a vehicle with the customer-visible side being outer face 104, and second component 200 may be a supporting substructure that is part of, or is attached to, the vehicle and on which first component 100 is fixedly mounted in precise alignment.

To provide an arrangement where elastically deformable alignment member 102 is configured and disposed to interferingly, deformably and matingly engage alignment aperture 204, a purposeful interference fit is created between the elastically deformable alignment member 102 and alignment aperture 204. For example, as shown in FIG. 5, at least a portion of alignment member 102a proximate center line 112 interferingly engages a portion of inner wall 202 proximate curve center line 214 of alignment aperture 204a, As illustrated, alignment member 102a interferingly engages and is elastically deformed between opposed walls 203 and 205 defined by inner wall 202. As such, the opposing forces created by the interferences with opposed walls 203 and 205 facilitate precisely aligning corner regions 110 and 212. Further, at least a portion of each alignment member corner portion 114 interferingly engages a portion of inner wall 202 of alignment aperture 204a.

As shown in FIG. 6, at least a portion of alignment member 102b proximate curve center line 112 interferingly engages portion 205 of inner wall 202 proximate center line 214 of alignment aperture 204b, At least a portion of each alignment member end portion 116 interferingly engages portion 203 of inner wall 202 of alignment aperture 204b, As shown in FIG. 7, at least a portion of alignment member 102c proximate each curve center line 112 interferingly engages portion 203 or 205 of inner wall 202 (e.g., along center line 214 of alignment aperture 204c). Further, at least a portion of each alignment member end portion 118 interferingly engages a portion of inner wall 202 of alignment aperture 204c, As such, when inserted into alignment aperture 204, portions of the elastically deformable alignment member 102 elastically deform to an elastically averaged final configuration that aligns alignment member 102 with the alignment aperture 204 in four planar orthogonal directions (the +/−x-direction and the +/−y-direction). System 10 thus facilitates uniform mating and alignment of corner regions 110, 212 of interfacing first and second components 100, 200, facilitates reducing gaps between components 100, 200, and facilitates providing a stiffened and more robust interface between the corner regions of components 100, 200.

While FIG. 1 depicts two elastically deformable alignment members 102 in corresponding apertures 204 to provide four-way alignment of first component 100 relative to second component 200, it will be appreciated that the scope of the invention is not so limited and encompasses other quantities and types of elastically deformable alignment elements used in conjunction with the elastically deformable alignment members 102 and corresponding apertures 204.

In view of all of the foregoing, and with reference now to FIG. 8, it will be appreciated that an embodiment of the invention also includes a vehicle 40 having a body 42 with an elastically averaging alignment system 10 as herein disclosed integrally arranged with the body 42. In the embodiment of FIG. 8, the elastically averaging alignment system 10 is depicted forming at least a portion of a front grill of the vehicle 40. However, it is contemplated that an elastically averaging alignment system 10 as herein disclosed may be utilized with other features or components of vehicle 40, such as bezels, door trim, exterior applications (e.g., around lighting, grills, etc.), and decorative components (e.g., chrome strips).

An exemplary method of fabricating elastically averaged alignment system 10 includes forming first component 100 with at least one corner region 110 having at least one of alignment member 102. Second component 200 is formed with at least one corner region 212 having inner wall 202 that defines at least one alignment aperture 204. Alignment members 102 may be formed as linear tab 102a, curved tab 102b, and wave-shaped tab 102c, Alignment apertures 204 may be formed as curved slots 204a, 204c, and as linear slot 204b, Alignment members 102 are formed from an elastically deformable material such that when alignment member 102 is inserted into alignment aperture 204, alignment member 102 elastically deforms to an elastically averaged final configuration to facilitate aligning first component 100 and second component 200 in a desired orientation. More particularly, alignment member 102 elastically deforms to an elastically averaged final configuration to facilitate aligning each pair of corresponding corner regions 110 and 212 in a desired orientation.

An exemplary method of coupling matable components 100, 200 includes providing first component 100 with at least one corner region 110 having alignment member 102. Second component is formed with at least one corner region 212 having inner wall 202 defining alignment aperture 204. Alignment member 102 is formed from an elastically deformable material, and alignment member 102 is inserted into alignment aperture 204 such that alignment member 102 elastically deforms to an elastically averaged final configuration to facilitate aligning first component 100 and second component 200 in a desired orientation. The method may also include forming alignment member 102 as linear tab 102a, curved tab 102b, and wave-shaped tab 102c; and forming alignment apertures 204 as curved slots 204a, 204c, and as linear slot 204b, As such, during insertion of alignment member 102 into alignment aperture 204, at least a portion of alignment member 102 along center line 112 interferingly engages a portion of inner wall 202 of alignment aperture 204.

Systems and methods for elastically averaged mating assemblies are described herein. The systems generally include a first component with an elastically deformable alignment member positioned for insertion into an alignment aperture of a second component. The mating of the first and second components is elastically averaged over corresponding pair(s) of elastically deformable alignment members and alignment apertures to precisely mate the components in a desired orientation. Moreover, the systems include alignment members and alignment apertures positioned on corner regions of the first and second components. The shapes and/or orientations of the alignment members and corresponding alignment apertures facilitate an interference fit therebetween to precisely orient the two components and to provide a stiff corner interface.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system comprising:
   a first component comprising at least one corner region having an alignment member comprising a proximal end extending from an inner surface of the first component; and
   a second component comprising at least one corner region having an inner wall defining an alignment aperture extending into an inner face of the second component, the alignment aperture comprising a pair of opposed walls configured to receive at least a portion of the alignment member to couple the first component and the second component,
   wherein at least one of the proximal end of the alignment member and the inner wall of the alignment aperture includes a curved portion; and
   wherein the alignment member is an elastically deformable material such that when the alignment member is inserted into the alignment aperture, an interference fit is formed between the alignment member and the opposed walls of the alignment aperture along the at least one curved portion, and the alignment member elastically deforms to an elastically averaged final configuration to facilitate aligning the corner regions of the first and second components in a desired orientation.

2. The system of claim 1, wherein the alignment aperture is a slot.

3. The system of claim 2, wherein the slot is curved.

4. The system of claim 2, wherein the slot is oriented at 45° with respect to a pair of intersecting edges of the second component defining the second component corner region.

5. The system of claim 1, wherein the alignment member is a tab.

6. The system of claim 5, wherein the tab is rectangular.

7. The system of claim 5, wherein the tab is curved.

8. The system of claim 5, wherein the tab is wave-shaped.

9. The system of claim 1, wherein the alignment aperture is a curved slot and the alignment member is a tab, wherein a portion of the tab proximate a tab center line facilitates an interference fit with a portion of the inner wall at a curve center line when the alignment member is inserted into the alignment aperture, and wherein the tab includes at least one corner that facilitates an interference fit with a portion of the inner wall when the alignment member is inserted into the alignment aperture.

10. The system of claim 1, wherein the alignment aperture is a slot and the alignment member is a curved tab, a portion of the curved tab proximate a curve center line facilitating an interference fit with a portion of the inner wall at a center line when the alignment member is inserted into the alignment aperture.

11. The system of claim 1, wherein the alignment aperture is a curved slot and the alignment member is a wave-shaped tab, a crest of each wave-shape of the tab facilitating an interference fit with the inner wall when the alignment member is inserted into the alignment aperture.

12. A vehicle comprising:
a body; and
an elastically averaged alignment system integrally arranged with the body, the elastically averaged alignment system comprising:
a first component comprising at least one corner region having an alignment member comprising a proximal end extending from an inner surface of the first component; and
a second component comprising at least one corner region having an inner wall defining an alignment aperture extending into an inner face of the second component, the alignment aperture comprising a pair of opposed walls configured to receive at least a portion of the alignment member to couple the first component and the second component,
wherein at least one of the proximal end of the alignment member and the inner wall of the alignment aperture includes a curved portion; and
wherein the alignment member is an elastically deformable material such that when the alignment member is inserted into the alignment aperture, an interference fit is formed between the alignment member and the opposed walls of the alignment aperture along the at least one curved portion, and the alignment member elastically deforms to an elastically averaged final configuration to facilitate aligning the corner regions of the first and second components in a desired orientation.

13. The vehicle of claim 12, wherein the alignment aperture is a curved slot and the alignment member is a tab, a portion of the tab proximate a tab center line facilitating an interference fit with a portion of the inner wall at a curve center line when the alignment member is inserted into the alignment aperture.

14. The system of claim 12, wherein the alignment aperture is a slot and the alignment member is a curved tab, a portion of the curved tab proximate a curve center line facilitating an interference fit with a portion of the inner wall at a center line when the alignment member is inserted into the alignment aperture.

15. The system of claim 12, wherein the alignment aperture is a curved slot and the alignment member is a wave-shaped tab, a crest of each wave-shape of the tab facilitating an interference fit with the inner wall when the alignment member is inserted into the alignment aperture.

16. A method of coupling a first component and a second component, the method comprising:
providing a first component that includes at least one corner region having an alignment member comprising a proximal end extending from an inner surface of the first component;
providing a second component that includes at least one corner region having an inner wall defining an alignment aperture extending into an inner face of the second component, the alignment aperture comprising a pair of opposed walls configured to receive at least a portion of the alignment member,
wherein at least one of the proximal end of the alignment member and the inner wall of the alignment aperture includes a curved portion;
forming the alignment member from an elastically deformable material; and
inserting the alignment member into the alignment aperture such that an interference fit is formed between the alignment member and the opposed walls of the alignment aperture along the at least one curved portion, and the alignment member elastically deforms to an elastically averaged final configuration to facilitate coupling the first and second components and aligning the corner regions in a desired orientation.

17. The method of claim 16, further comprising:
forming the alignment aperture as a curved slot; and
forming the alignment member as a tab, wherein during insertion of the alignment member into the alignment aperture, a portion of the tab proximate a tab center line provides an interference fit with a portion of the inner wall at a curve center line.

18. The method of claim 16, further comprising:
forming the alignment aperture as a slot; and
forming the alignment member as a curved tab, wherein during insertion of the alignment member into the alignment aperture, a portion of the tab proximate a curve center line provides an interference fit with a portion of the inner wall at a center line.

19. The method of claim 16, further comprising:
forming the alignment aperture as a curved slot; and
forming the alignment member as a wave-shaped tab, wherein during insertion, a crest of each wave-shape of the tab provides an interference fit with the inner wall.

* * * * *